US012028723B2

(12) United States Patent
Shi

(10) Patent No.: US 12,028,723 B2
(45) Date of Patent: Jul. 2, 2024

(54) METHOD FOR FREQUENCY MEASUREMENT AND RELATED APPARATUSES

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 447 days.

(21) Appl. No.: 17/544,841

(22) Filed: Dec. 7, 2021

(65) Prior Publication Data

US 2022/0095134 A1 Mar. 24, 2022

Related U.S. Application Data

(63) Continuation of application No. PCT/CN2019/095122, filed on Jul. 8, 2019.

(51) Int. Cl.
*H04W 24/02* (2009.01)
*H04W 24/10* (2009.01)
(Continued)

(52) U.S. Cl.
CPC .......... *H04W 24/02* (2013.01); *H04W 24/10* (2013.01); *H04W 72/0453* (2013.01); *H04W 72/56* (2023.01); *H04W 52/0209* (2013.01)

(58) Field of Classification Search
CPC ..... H04W 24/02; H04W 72/56; H04W 24/10; H04W 72/0453; H04W 52/0209
See application file for complete search history.

(56) References Cited

U.S. PATENT DOCUMENTS 5,150,387 A * 9/1992 Yoshikawa ............. G10L 19/24
704/229
8,849,299 B2 9/2014 Alfano et al.
(Continued)

FOREIGN PATENT DOCUMENTS

CN 101848520 A 9/2010
CN 102271359 A 12/2011
(Continued)

OTHER PUBLICATIONS

Media Tek Inc., Report of email discussion [105bis#29][NR/Power Saving] RRM solutions, 3GPP TSG-RAN WG2 Meeting #106, R2-1906500, May 13-17, 2019. (20 pages).
(Continued)

*Primary Examiner* — Jael M Ulysse
(74) *Attorney, Agent, or Firm* — Young Basile Hanlon & MacFarlane, P.C.

(57) ABSTRACT

A method for frequency measurement and related apparatuses are provided. The method includes the following. M first frequencies are measured on condition that a user equipment has a power-saving requirement. Electricity consumed by measuring the M first frequencies is less than that consumed by measuring N first frequencies. The N first frequencies are measured on condition that the user equipment has no power-saving requirement. N is a positive integer and larger than or equals M. A first priority of the first frequency is higher than a second priority of a second frequency, where a current serving cell which the UE is camped on is on the second frequency.

20 Claims, 2 Drawing Sheets

(51) Int. Cl.
*H04W 72/0453* (2023.01)
*H04W 72/56* (2023.01)
*H04W 52/02* (2009.01)

(56) References Cited

U.S. PATENT DOCUMENTS

| | | | |
|---|---|---|---|
| 10,433,244 B2* | 10/2019 | Song | H04W 48/20 |
| 2009/0088160 A1 | 4/2009 | Pani et al. | |
| 2013/0210441 A1* | 8/2013 | Nader | H04W 36/0088 |
| | | | 455/437 |
| 2014/0003259 A1 | 1/2014 | Chin et al. | |
| 2014/0126403 A1* | 5/2014 | Siomina | H04J 11/005 |
| | | | 370/252 |
| 2015/0029917 A1* | 1/2015 | Kim | H04W 52/0209 |
| | | | 370/311 |
| 2016/0219589 A1* | 7/2016 | Khawer | H04W 24/02 |
| 2016/0295471 A1* | 10/2016 | Song | H04W 48/20 |
| 2016/0373978 A1* | 12/2016 | Pakniat | H04W 48/12 |
| 2017/0223601 A1* | 8/2017 | Egner | A61B 5/14532 |
| 2017/0251389 A1 | 8/2017 | Hong et al. | |
| 2019/0110254 A1* | 4/2019 | Yerramalli | H04L 27/2646 |
| 2019/0166535 A1* | 5/2019 | Fujishiro | H04W 36/24 |
| 2020/0037321 A1* | 1/2020 | Karimli | H04W 72/0453 |
| 2020/0154316 A1* | 5/2020 | Ku | H04W 88/02 |

FOREIGN PATENT DOCUMENTS

| | | | | |
|---|---|---|---|---|
| CN | 102917380 A | 2/2013 | | |
| CN | 103402222 A | 11/2013 | | |
| CN | 104205931 A | 12/2014 | | |
| CN | 105282791 A | 1/2016 | | |
| CN | 107995648 A | 5/2018 | | |
| CN | 109309900 A | 2/2019 | | |
| CN | 109391952 A | 2/2019 | | |
| EP | 2587857 A2 | 5/2013 | | |
| WO | 2009038368 A1 | 3/2009 | | |
| WO | WO-2009038368 A1 * | 3/2009 | | H04J 11/0086 |
| WO | WO-2016011752 A1 * | 1/2016 | | H04W 24/08 |
| WO | 2018148662 A1 | 8/2018 | | |
| WO | 2018228270 A1 | 12/2018 | | |

OTHER PUBLICATIONS

Vivo, Offline outcome of UE power Consumption Reduction in RRM Measurements, 3GPP TSG RAN WG1 Meeting #94bis, R1-1811962, Oct. 8-12, 2018. (6 pages).
Extended European Search Report for EP Application 19936612.1 mailed May 13, 2022. (13 pages).
Chinese First Office Action with English Translation for CN Application 202210080841.2 mailed Jan. 19, 2023. (20 pages).
Chinese Second Office Action with English Translation for CN Application 202210080841.2 mailed Mar. 2, 2023. (15 pages).
Chinese Decision of Rejection with English Translation for CN Application No. 202210080841.2 mailed Apr. 12, 2023. (10 pages).
International Search Report with English Translation for PCT Application PCT/CN2019/095122 mailed Apr. 8, 2020. (17 pages).

* cited by examiner

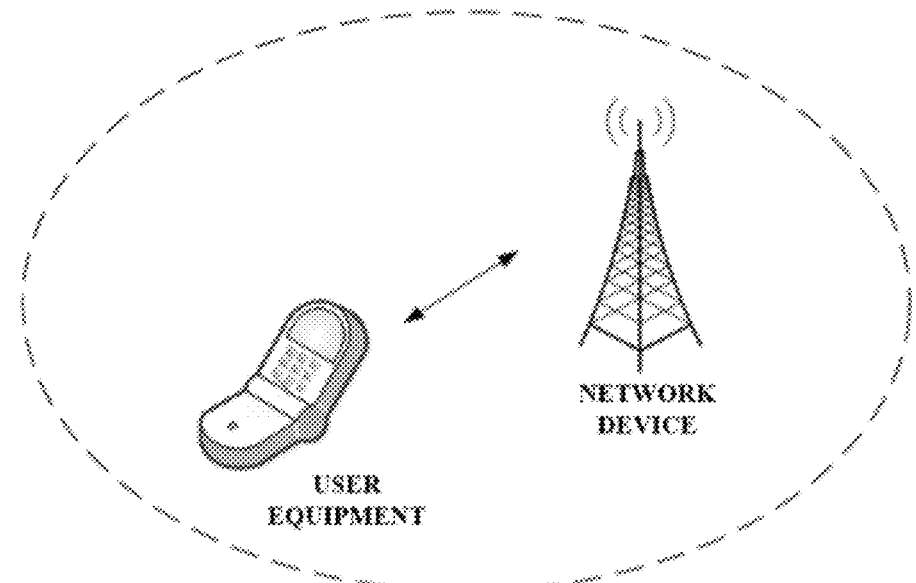

FIG. 1

Measure M first frequencies on condition that a user equipment has a power-saving requirement, where electricity consumed by measuring the M first frequencies is less than that consumed by measuring N first frequencies, the N first frequencies are measured on condition that the user equipment has no power-saving requirement, N is a positive integer and larger than or equals M, and a first priority of the first frequency is higher than a second priority of a second frequency, where a current serving cell which the user equipment is camped on is on the second frequency

METHOD FOR FREQUENCY MEASUREMENT AND RELATED APPARATUSES

CROSS-REFERENCE TO RELATED APPLICATION(S)

This application is a continuation of International Application No. PCT/CN2019/095122, filed on Jul. 8, 2019, the disclosure of which is hereby incorporated by reference in its entirety.

TECHNICAL FIELD

This disclosure relates to the technical field of communication, and particularly to a method for frequency measurement and related apparatuses.

BACKGROUND

In a narrow band-internet of things (NB-IoT) system and an enhanced machine-type communication (eMTC) system, since priorities of measured frequencies are not be differentiated in an idle state, measurements on all frequencies can be relaxed together. The frequency-priority concept is still retained in a fifth generation (5G) system. Regardless of the quality of a serving cell, a user equipment (UE) always performs cell search and measurements on high-priority frequencies to satisfy a requirement for load balance raised by an operator. Whereas for a UE with a power-saving requirement, electricity consumption may be increased in case of always measuring the high-priority frequencies.

SUMMARY

In implementations of the disclosure, a method for frequency measurement and related apparatuses are provided.

In a first aspect, a method for frequency measurement is provided in implementations of the disclosure. The method includes the following. M first frequencies are measured on condition that a user equipment (UE) has a power-saving requirement. Electricity consumed by measuring the M first frequencies is less than that consumed by measuring N first frequencies. The N first frequencies are measured on condition that the UE has no power-saving requirement. N is a positive integer and larger than or equals M. A first priority of the first frequency is higher than a second priority of a second frequency, where a current serving cell which the UE is camped on is on the second frequency.

In a second aspect, a UE is provided in implementations of the disclosure. The UE includes a processor and a memory storing a computer which, when executed by the processor, causes the processor to measure M first frequencies on condition that the UE has a power-saving requirement. Electricity consumed by measuring the M first frequencies is less than that consumed by measuring N first frequencies. The N first frequencies are measured on condition that the UE has no power-saving requirement. N is a positive integer and larger than or equals M. A first priority of the first frequency is higher than a second priority of a second frequency, where a current serving cell which the UE is camped on is on the second frequency.

In a third aspect, a non-transitory computer-readable storage medium is provided in implementations of the disclosure. The storage medium stores a computer program which, when executed by a processor, causes the processor to carry out measuring M first frequencies on condition that the UE has a power-saving requirement. Electricity consumed by measuring the M first frequencies is less than that consumed by measuring N first frequencies. The N first frequencies are measured on condition that the UE has no power-saving requirement. N is a positive integer and larger than or equals M. A first priority of the first frequency is higher than a second priority of a second frequency, where a current serving cell which the UE is camped on is on the second frequency.

BRIEF DESCRIPTION OF DRAWINGS

To illustrate technical solutions in implementations of the disclosure more clearly, the following briefly introduces accompanying drawings required for describing the implementations. Apparently, the accompanying drawings described in the following illustrate some implementations of the disclosure. Those of ordinary skill in the art may also obtain other drawings based on these accompanying drawings without creative effort.

FIG. 1 is a schematic diagram illustrating a communication system according to implementations of the disclosure.

FIG. 2 is a schematic flow chart illustrating a method for frequency measurement according to implementations of the disclosure.

DETAILED DESCRIPTION

Figure 3:
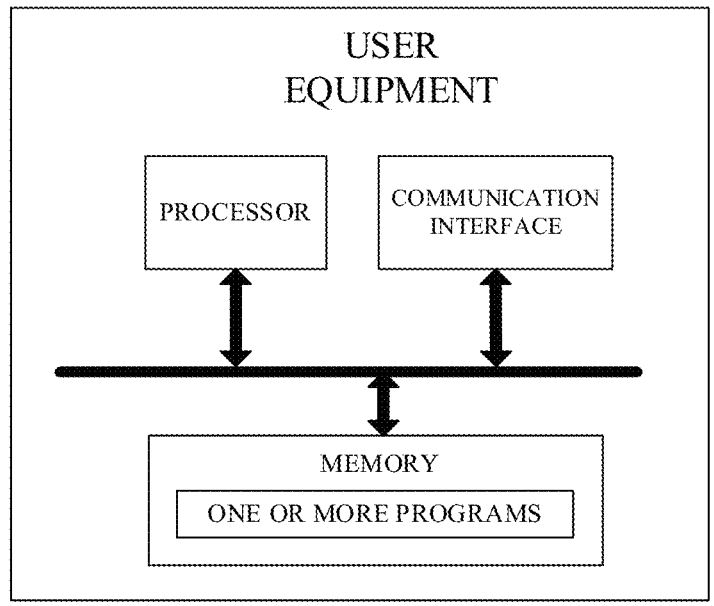
FIG. 3 is a schematic structural diagram illustrating a user equipment according to implementations of the disclosure.

Terms used in implementations of the disclosure is merely used to explain the implementations of the disclosure rather than limit the disclosure. The terms "first", "second", "third", "fourth", and the like used in the specification, the claims, and the accompany drawings of the disclosure are used to distinguish different objects rather than describe a particular order. Besides, the terms "include" and "have" as well as variations thereof are intended to cover non-exclusive inclusion.

FIG. 1 is a schematic diagram illustrating a communication system according to implementations of the disclosure. The communication system includes a network device and a user equipment (UE). As illustrated in FIG. 1, the network device can communicate with the UE. The communication system may be a global system for mobile communication (GSM), a code division multiple access (CDMA) system, a wideband code division multiple access (WCDMA) system, a worldwide interoperability for microwave access (WiMAX) system, a long term evolution (LTE) system, a fifth generation (5G) communication system (for example, new radio, NR), a communication system integrating various communication technologies (for example, a communication system integrating LTE and NR technology), or subsequent evolution communication systems. The shape and number of the network device and the UE as illustrated in FIG. 1 are merely examples, rather than limiting the implementations of the disclosure.

The UE in the disclosure has wireless communication functions, which may be deployed on land including outdoor or indoor (such as a handheld device, a wearable device or an in-vehicle device), on water (such as a ship), on air (such as an air plane, a balloon, a satellite, etc.). The UE may be a mobile phone, a pad, a computer with wireless transceiving functions, a virtual-reality (VR) terminal device, an augmented-reality (AR) terminal device, a wireless terminal in industrial control, a wireless terminal in self-driving, a wireless terminal in remote medical, a wireless terminal in smart grid, and a wireless terminal in smart home, etc. The UE may also be devices with wireless communication functions such as handheld devices, in-vehicle devices, wearable devices, and computing devices, or other processing devices connected to wireless modems, etc. The UE can be referred to as different names in different networks, such as terminal device, access terminal, subscriber unit, subscriber station, mobile station, remote station, remote terminal, mobile device, user terminal, terminal, wireless communication device, user agent or user device, cellular phone, cordless telephone, session initiation protocol (SIP) phone, wireless local loop (WLL) station, personal digital assistant (PDA), and terminal device in a 5G network or an LTE network, etc.

The network device in the disclosure is deployed in a radio access network (RAN) to provide radio communication functions. For example, the network device may be a RAN device at an access network side of a cellular network. The RAN device provides an access for the UE to a radio network, which includes but is not limited to an evolved node B (eNB), a radio network controller (RNC), a node B (NB), a base station controller (BSC), a base transceiver station (BTS), a home evolved node B or home node B (HNB), a base band unit (BB), and a mobility management entity (MME). For another example, the network device may be a node device in a wireless local area network (WLAN), such as an access controller (AC), a gateway, or a wireless fidelity (WIFI) access point (AP). For another example, the network device may also be a transmission reception point (TRP or TP) in the NR system, etc.

In the 5G network environment, in order to reduce air interface signaling and quickly restore radio connection and data services, a new radio resource control (RRC) state is defined, i.e., an RRC_INACTIVE state. The RRC_INACTIVE state is different from an RRC-IDLE state or an RRC_CONNECTED state.

RRC-IDLE: no RRC connection exists. Mobility is based on cell reselection performed by the UE. Paging is initiated by a core network (CN) and a paging area is configured by the CN. The network device does not include a UE access stratum (AS) context.

RRC-CONNECTED: RRC connection exists. A base station and the UE both include the UE AS context. The network device knows that a position of the UE is indicated via a cell level. The mobility is controlled by the network device. Unicast data can be transmitted between the UE and the network device.

RRC-INACTIVE: the mobility is based on the cell reselection performed by the UE. There exists a connection between the CN and the NR. The base station includes the UE AS context. The paging is initiated by the RAN. The paging area based on the RAN is managed by the RAN. The network device determines the position of the UE according to a level of the paging area based on the RAN.

In the RRC-IDLE state or the RRC-INACTIVE state, a neighboring cell measurement performed by the UE is restricted by a relevant parameter in a system broadcast message. For example, for initiation of an intra-frequency measurement, if a serving cell fulfils Srxlev>SIntraSearchP and Squal>SIntraSearchQ, an intra-frequency neighboring-cell measurement is not initiated, otherwise, the intra-frequency neighboring-cell measurement is initiated. For a lower or equal priority inter-frequency measurement, if the serving cell fulfils Srxlev>SnonIntraSearchP and Squal>SnonIntraSearchQ, the lower or equal priority inter-frequency measurement is not initiated, otherwise, the lower or equal priority inter-frequency measurement is initiated. A higher priority inter-frequency measurement is always initiated.

Srxlev represents a cell selection reception (RX) reference signal received power (RSRP) value. SIntraSearchP represents an RSRP threshold for the intra-frequency measurement. Squal represents a cell selection RX reference signal receiving quality (RSRQ) value. SIntraSearchQ represents an RSRQ threshold for the intra-frequency measurement. SnonIntraSearchP represents an RSRP threshold for the inter-frequency measurement. SnonIntraSearchQ represents an RSRQ threshold for the inter-frequency measurement.

A process of performing a measurement in the serving cell by the UE is called the intra-frequency measurement. For performing a measurement in a non-serving cell by the UE, there may be an inter-frequency measurement and an inter-system measurement. The inter-frequency measurement refers to that the UE performs a measurement in a non-serving cell in a current serving communication system, and the inter-system measurement refers to that the UE performs a measurement in a non-serving cell in another communication system.

A frequency priority configuration may be carried in system message signaling or an RRC release message. The network device configures a dedicated frequency priority for the UE. In response to reception of the dedicated frequency priority, the UE replaces a common frequency priority broadcasted by a system message with the dedicated frequency priority.

In the NB-IoT system and eMTC system, for the UE with low mobility, under a condition that RSRP of the serving cell changes less, the UE has a low requirement for cell reselection. As such, the UE can perform neighboring cell measurement relaxation to save power.

Under a condition that a system message (e.g., system information block 3 (SIB3)) is configured with s-SearchDeltaP, the UE can perform the neighboring cell measurement relaxation in the cell.

When at least one of the following conditions is satisfied, the UE can perform the neighboring cell measurement relaxation: 1) a condition of performing the neighboring cell measurement relaxation is satisfied within a time range TSearchDeltaP; 2) an interval between two successive measurements is less than 24 hours.

In an implementation, the condition of performing the neighboring cell measurement relaxation is (SrxlevRef−Srxlev)<SSearchDeltaP, where Srxlev represents currently measured Srxlev of the serving cell and SrxlevRef represents reference Srxlev of the serving cell.

When the UE performs cell selection or cell reselection to access a new cell, if (Srxlev−SrxlevRef)>0, or if the condition of performing the neighboring cell measurement relaxation is not satisfied during the time range TSearchDeltaP, the UE will set SrxlevRef as the currently measured Srxlev of the serving cell. In an implementation, TSearchDeltaP is 5 minutes. In another implementation, if extended discontinuous reception (eDRX) is configured and a period of the eDRX is longer than 5 minutes, TSearchDeltaP equals the period of the eDRX.

Both s-SearchDeltaP and SSearchDeltaP represent an increment RSRP search threshold. TSearchDeltaP represents increment RSRP search time.

FIG. 2 is a schematic flow chart illustrating a method for frequency measurement according to implementations of the disclosure. The method includes the following.

At block 201, a UE measures M first frequencies on condition that the UE has a power-saving requirement.

Electricity consumed by measuring the M first frequencies is less than that consumed by measuring N first frequencies. The N first frequencies are measured on condition that the UE has no power-saving requirement. N is a positive integer and larger than or equals M. A first priority of the first frequency is higher than a second priority of a second frequency, where a current serving cell which the UE is camped on is on the second frequency.

The N first frequencies include the M first frequencies. The N first frequencies are determined according to a frequency list provided by a network device. The frequency list is illustrated in Table 1, and the UE can obtain the N first frequencies via Table 1.

TABLE 1

| Frequency | Priority |
| --- | --- |
| Frequency 1 | Priority 1 |
| Frequency 2 | Priority 2 |
| Frequency 3 | Priority 3 |
| . . . | . . . |

Measuring frequencies refers to measuring reference signals sent by cells on the frequencies measured.

As can be seen, in the implementations of the disclosure, on condition that the UE has the power-saving requirement, electricity consumed by measuring high-priority frequencies is reduced, thereby reducing electricity consumed by an electronic device.

In an implementation of the disclosure, prior to measuring the M first frequencies by the UE, the method further includes the following. The UE obtains the M first frequencies by selecting from the N first frequencies.

In an implementation of the disclosure, prior to obtaining the M first frequencies by selecting from the N first frequencies by the UE, the method further includes the following. The UE determines M according to N and a first ratio. The first ratio is smaller than 1, which may be, for example, 20%, 35%, 50%, 70%, etc.

In an implementation of the disclosure, the first ratio is determined according to a first system message or first RRC signaling.

The first system message may include but is not limited to at least one of a master information block (MIB) and an SIB or at least one of minimum system information (MSI), remaining minimum system information (RMSI), etc.

The RRC signaling may include but is not limited to any of an RRC release message, an RRC connection reconfiguration message, an RRC connection reestablishment message, an RRC connection setup message, an RRC connection resume message, etc.

In an implementation of the disclosure, the UE determines M according to N and the first ratio as follows. The UE determines M by rounding up a product of N and the first ratio. For example, if the first ratio is 35% and N is 15, then M equals 6.

In an implementation, the UE determines M according to N and the first ratio as follows. The UE determines M by rounding down the product of N and the first ratio. For example, if the first ratio is 35% and N is 15, then M equals 5.

In an implementation, prior to obtaining the M first frequencies by selecting from the N first frequencies by the UE, the method further includes the following. The UE determines the smaller of N and K as M. K is preconfigured and is the number of the first frequencies to be measured on condition that the UE has the power-saving requirement.

K is preconfigured by the UE or by the network device. In an implementation, K may be preconfigured via a fourth system message or fourth RRC signaling.

In an implementation, the fourth system message may include but is not limited to at least one of the MIB and the SIB, or at least one of the MSI, the RMSI, etc.

In an implementation, the fourth RRC signaling may include but is not limited to any of the RRC release message, the RRC connection reconfiguration message, the RRC connection reestablishment message, the RRC connection setup message, the RRC connection resume message, etc.

For example, if N is 15 and K is 10, then M equals 10. For another example, if N is 10 and K is 15, then M equals 10.

In an implementation of the disclosure, the UE obtains the M first frequencies by selecting from the N first frequencies as follows. The UE obtains the M first frequencies by randomly selecting from the N first frequencies.

In an implementation of the disclosure, the UE obtains the M first frequencies by selecting from the N first frequencies as follows. The UE obtains the M first frequencies by selecting from the N first frequencies in descending order of priorities of the N first frequencies.

For example, if N is 5 and M is 3, the 5 first frequencies include first frequency 1, first frequency 2, first frequency 3, first frequency 4, and first frequency 5, and a priority relation among the 5 first frequencies is a priority of first frequency 1>a priority of first frequency 2>a priority of first frequency 3>a priority of first frequency 4>a priority of first frequency 5, then the M first frequencies are first frequency 1, first frequency 2, and first frequency 3.

As can be seen, in the implementation of the disclosure, on condition that the UE has the power-saving requirement, the number of high-priority frequencies to be detected is reduced, thereby reducing the electricity consumed by the electronic device.

In an implementation of the disclosure, prior to measuring the M first frequencies by the UE, the method further includes the following. The UE sets a priority of each of the M first frequencies as a third priority. The third priority is lower than the first priority.

In an implementation of the disclosure, prior to setting the priority of each of the M first frequencies as the third priority by the UE, the method further includes the following. The UE sends first information to the network device. The first information is indicative of that the UE has the power-saving requirement. The UE receives second information from the network device. The second information is indicative of that a priority of at least one of the first frequencies is allowed to be set as the third priority.

The first information may be carried in RRC signaling, a medium access control (MAC) control element (CE), or other RRC messages. The second information may be carried in RRC signaling or other RRC messages. The RRC signaling may be the RRC release message or the RRC reconfiguration message.

The second information is indicative of that priorities of all or part of the first frequencies are allowed to be set as the third priority.

The second information is further indicative of first frequencies allowed to be set in terms of priorities and/or a maximum number of the first frequencies allowed to be set in terms of priorities, on condition that the second information indicates that priorities of part of the first frequencies are allowed to be set as the third priority.

In an implementation of the disclosure, N equals M on condition that the second information indicates that a priority of each of the first frequencies is allowed to be set as the third priority.

In other words, under a condition that the second information is indicative of that priorities of all the first frequencies are allowed to be set as the third priority, and the UE has the power-saving requirement, the UE sets the priority of each of the N first frequencies as the third priority.

In an implementation of the disclosure, the second information is further indicative of first frequencies allowed to be set in terms of priorities on condition that the second information indicates that priorities of part of the first frequencies are allowed to be set as the third priority. Prior to setting the priority of each of the M first frequencies as the third priority by the UE, the method further includes the following. The UE determines the M first frequencies according to the second information.

Further, the first frequencies allowed to be set in terms of priorities indicated via the second information include Y first frequencies, where Y is a positive integer. The UE determines the M first frequencies according to the second information as follows. The UE sets overlapping first frequencies between the Y first frequencies and the N first frequencies as the M first frequencies.

For example, if N is 5 and the 5 first frequencies include first frequency 1, first frequency 2, first frequency 3, first frequency 4, and first frequency 5, and if Y is 2 and the Y first frequencies include first frequency 1 and first frequency 2, then the M first frequencies determined by the UE according to the second information include first frequency 1 and first frequency 2. For another example, if N is 5 and the 5 first frequencies include first frequency 1, first frequency 2, first frequency 3, first frequency 4, and first frequency 5, and if Y is 3 and the 3 first frequencies include first frequency 1, first frequency 2, and first frequency 6, then the M first frequencies determined by the UE according to the second information include first frequency 1 and first frequency 2.

In an implementation of the disclosure, the second information is further indicative of the maximum number of the first frequencies allowed to be set in terms of priorities on condition that the second information indicates that priorities of part of the first frequencies are allowed to be set as the third priority. Prior to setting the priority of each of the M first frequencies as the third priority, the method further includes the following. The UE obtains the M first frequencies by selecting from the N first frequencies randomly or in descending order of the priorities of the N first frequencies on condition that N is larger than the maximum number, where M is the maximum number.

For example, if N is 5 and the maximum number is 3, the UE obtains the 3 first frequencies by randomly selecting from the 5 first frequencies. If the 5 first frequencies include first frequency 1, first frequency 2, first frequency 3, first frequency 4, and first frequency 5, and the priority relation among the 5 first frequencies is the priority of first frequency 1>the priority of first frequency 2>the priority of first frequency 3>the priority of first frequency 4>the priority of first frequency 5, then the 3 first frequencies that the UE obtains by selecting from the 5 first frequencies are first frequency 1, first frequency 2, and first frequency 3.

In an implementation of the disclosure, the method further includes the following. The UE sets the N first frequencies as the M first frequencies on condition that N is smaller than the maximum number.

In an implementation of the disclosure, after setting the priority of each of the M first frequencies, the UE conducts a measurement on the M first frequencies. The measurement on the M first frequencies is the same as that on a third frequency. A priority of the third frequency is the third priority.

The measurement includes a time of initiating the measurement, a time of terminating the measurement, and a time of relaxing the measurement.

As can be seen, in the implementation of the disclosure, on condition that the UE has the power-saving requirement, by reducing priorities of frequencies to be detected, an interval of measurements on high-priority frequencies is increased, thereby reducing the electricity consumed by the electronic device.

In an implementation of the disclosure, the UE measures the M first frequencies as follows. The UE determines H first frequencies previously undetected by the UE. The M first frequencies include the H first frequencies and H is a positive integer. The UE measures the first frequencies among the M first frequencies except for the H first frequencies. In other words, the UE will not measure the H first frequencies.

Further, the UE determines the H first frequencies as follows. The UE determines a current position of the UE. The UE obtains X first frequencies previously measured in the current position, where X is a positive integer. The UE obtains the H first frequencies by selecting from the X first frequencies.

Further, the UE obtains the X first frequencies measured in the current position as follows. The UE obtains a frequency measurement record related to the current position, and obtains the X first frequencies according to the frequency measurement record.

For example, if X is 5, the 5 first frequencies include first frequency 1, first frequency 2, first frequency 3, first frequency 4, and first frequency 5, and first frequency 1 and first frequency 2 among the 5 first frequencies were not previously detected by the UE, and if M is 6, and the 6 first frequencies include first frequency 1, first frequency 2, first frequency 3, first frequency 4, first frequency 5, and first frequency 6, the UE will not measure first frequency 1 and first frequency 2 and will measure first frequency 3, first frequency 4, first frequency 5, and the first frequency 6.

As can be seen, in the implementation of the disclosure, the UE will not measure the high-priority frequencies previously undetected, and thus the number of the high-priority frequencies to be detected is further reduced, thereby further reducing the electricity consumed by the electronic device.

In an implementation of the disclosure, a first measurement period of measuring the first frequencies is different from a second measurement period of measuring the second frequencies. A priority of the second frequency is lower than the priority of the first frequency. The second measurement period is longer than the first measurement period.

Further, when the UE assesses that movement status of the UE is low-mobility status, the UE will adopt different measurement periods for the first frequencies and the second frequencies. For example, the second frequencies will be measured every 24 hours, and the first frequencies will be measured every 10 minutes. The UE can use a judgement rule in NB-IoT to assess the movement status of the UE.

In an implementation of the disclosure, the first measurement period and the second measurement period are determined according to a second system message, the first measurement period and the second measurement period are determined according to second RRC signaling, or the first measurement period and the second measurement period are defined by a protocol.

The second system message may include but is not limited to at least one of the MIB and the SIB or at least one of the MSI, the RMSI, etc.

The second RRC signaling may include but is not limited to any of the RRC release message, the RRC connection reconfiguration message, the RRC connection reestablishment message, the RRC connection setup message, the RRC connection resume message, etc.

In an implementation of the disclosure, a third measurement period of measuring the M first frequencies is different from a fourth measurement period of measuring the N first frequencies.

The third measurement period is longer than the fourth measurement period.

The third measurement period and the fourth measurement period are determined according to a third system message, the third measurement period and the fourth measurement period are determined according to third RRC signaling, or the third measurement period and the fourth measurement period are defined by a protocol.

The third system message may include but is not limited to at least one of the MIB and the SIB or at least one of the MSI, the RMSI, etc.

The third RRC signaling may include but is not limited to any of the RRC release message, the RRC connection reconfiguration message, the RRC connection reestablishment message, the RRC connection setup message, the RRC connection resume message, etc.

As can be seen, in the implementation of the disclosure, on condition that the UE has the power-saving requirement, one measurement period is adopted to measure high-priority frequencies. On condition that the UE has no power-saving requirement, another measurement period is adopted to measure the high-priority frequencies. The one measurement period is longer than the other measurement period, which increases the interval of the measurements on the high-priority frequencies, thereby reducing the electricity consumed by the electronic device.

In an implementation of the disclosure, the method further includes the following. The UE determines that the UE has the power-saving requirement on condition that remaining electricity of the UE is less than or equals a first threshold.

For example, the first threshold may be 10%, 15%, 20%, etc.

In an implementation of the disclosure, the method further includes the following. The UE determines that the UE has the power-saving requirement in response to reception of third information from the network device, where the third information is used to instruct the UE to enter a power-saving mode.

Further, prior to the reception of the third information from the network device, the method further includes the following. The UE sends fourth information to the network device, where the fourth information carries the remaining electricity of the UE.

In an implementation of the disclosure, the UE does not measure first frequencies among the N first frequencies except for the M first frequencies on condition that the UE has the power-saving requirement and N is larger than M.

FIG. 3 illustrates a UE according to implementations of the disclosure. The UE includes one or more processors, one or more memories, one or more communication interfaces, and one or more programs. The one or more programs are stored in the one or more memories, and configured to be executed by the one or more processors. The programs include instructions for executing the following operations.

M first frequencies are measured on condition that the UE has a power-saving requirement. Electricity consumed by measuring the M first frequencies is less than that consumed by measuring N first frequencies. The N first frequencies are measured on condition that the UE has no power-saving requirement. N is a positive integer and larger than or equals M. A first priority of the first frequency is higher than a second priority of a second frequency, where a current serving cell which the UE is camped on is on the second frequency.

In an implementation of the disclosure, prior to measuring the M first frequencies, the programs further include instructions for executing the following operation. The M first frequencies are obtained by selecting from the N first frequencies.

In an implementation of the disclosure, prior to obtaining the M first frequencies by selecting from the N first frequencies, the programs further include instructions for executing the following operation. M is determined according to N and a first ratio.

In an implementation of the disclosure, the first ratio is determined according to a first system message or RRC signaling.

In an implementation of the disclosure, in terms of determining M according to N and the first ratio, the programs include instructions for executing the following operation. M is determined by rounding up a product of N and the first ratio.

In an implementation of the disclosure, in terms of determining M according to N and the first ratio, the programs include instructions for executing the following operations. M is determined by rounding down the product of N and the first ratio.

In an implementation of the disclosure, prior to obtaining the M first frequencies by selecting from the N first frequencies, the programs further include instructions for executing the following operation. The smaller of N and K is determined as M. K is preconfigured and is the number of the first frequencies to be measured on condition that the UE has the power-saving requirement.

In an implementation of the disclosure, in terms of obtaining the M first frequencies by selecting from the N first frequencies, the programs include instructions for executing the following operation. The M first frequencies are obtained by randomly selecting from the N first frequencies.

In an implementation of the disclosure, in terms of obtaining the M first frequencies by selecting from the N first frequencies, the programs include instructions for executing the following operation. The M first frequencies are obtained by selecting from the N first frequencies in descending order of priorities of the N first frequencies.

In an implementation of the disclosure, prior to measuring the M first frequencies, the programs further include instructions for executing the following operation. A priority of each of the M first frequencies is set as a third priority, where the third priority is lower than the first priority.

In an implementation of the disclosure, prior to setting the priority of each of the M first frequencies as the third priority, the programs further include instructions for executing the following operations. First information is sent to a network device, where the first information is indicative of that the UE has the power-saving requirement. Second information is received from the network device, where the second information is indicative of that a priority of at least one of the first frequencies is allowed to be set as the third priority.

In an implementation of the disclosure, N equals M on condition that the second information indicates that a priority of each of the first frequencies is allowed to be set as the third priority.

In an implementation of the disclosure, the second information is further indicative of first frequencies allowed to be set in terms of priorities on condition that the second information indicates that priorities of part of the first frequencies are allowed to be set as the third priority. The programs further include instructions for executing the following operation. Prior to setting the priority of each of the M first frequencies as the third priority, the M first frequencies are determined according to the second information.

In an implementation of the disclosure, the second information is further indicative of a maximum number of the first frequencies allowed to be set in terms of priorities on condition that the second information indicates that priorities of part of the first frequencies are allowed to be set as the third priority. The programs further include instructions for executing the following operation. Prior to setting the priority of each of the M first frequencies as the third priority, the M first frequencies are obtained by selecting from the N first frequencies randomly or in descending order of the priorities of the N first frequencies on condition that N is larger than the maximum number, where M is the maximum number.

In an implementation, the programs further include instructions for executing the following operation. The N first frequencies are set as the M first frequencies on condition that N is smaller than the maximum number.

In an implementation of the disclosure, after setting the priority of each of the M first frequencies, a measurement is conducted on the M first frequencies, where the measurement on the M first frequencies is the same as that on a third frequency, and a priority of the third frequency is the third priority.

In an implementation, in terms of measuring the M first frequencies, the programs include instructions for executing the following operations. H first frequencies previously undetected by the UE are determined, where the M first frequencies include the H first frequencies and H is a positive integer. The first frequencies among the M first frequencies except for the H first frequencies are measured.

In an implementation of the disclosure, a first measurement period of measuring the first frequencies is different from a second measurement period of measuring the second frequencies, where a priority of the second frequency is lower than the priority of the first frequency.

In an implementation of the disclosure, the first measurement period and the second measurement period are determined according to a second system message, the first measurement period and the second measurement period are determined according to second RRC signaling, or the first measurement period and the second measurement period are defined by a protocol.

In an implementation of the disclosure, a third measurement period of measuring the M first frequencies is different from a fourth measurement period of measuring the N first frequencies.

In an implementation of the disclosure, the third measurement period and the fourth measurement period are determined according to a third system message, the third measurement period and the fourth measurement period are determined according to third RRC signaling, or the third measurement period and the fourth measurement period are defined by a protocol.

In an implementation, the programs further include instructions for executing the following operation. The UE determines that the UE has the power-saving requirement on condition that remaining electricity of the UE is less than or equals a first threshold.

In an implementation of the disclosure, the programs further include instructions for executing the following operation. The UE determines that the UE has the power-saving requirement in response to reception of third information from the network device, where the third information is used to instruct the UE to enter a power-saving mode.

In an implementation, first frequencies among the N first frequencies except for the M first frequencies are not measured on condition that the UE has the power-saving requirement and N is larger than M.

It can be noted that for detailed implementation process of the implementations, reference can be made to the detailed implementation process in the method implementations, which will not be repeated herein.

Figure 4:
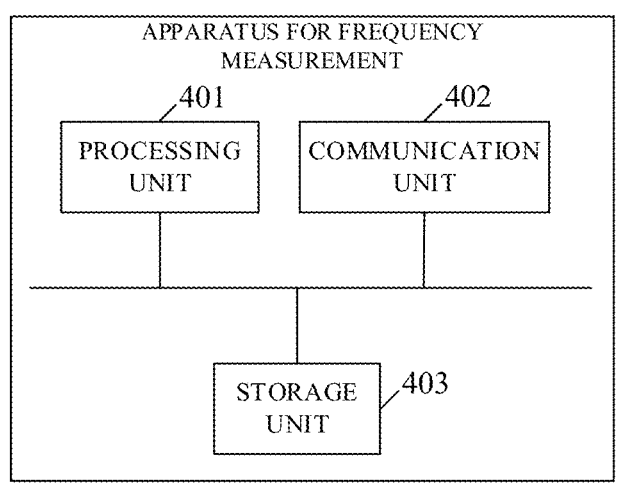
FIG. 4 is a schematic structural diagram illustrating an apparatus for frequency measurement according to implementations of the disclosure.

FIG. 4 illustrates an apparatus for frequency measurement according to implementations of the disclosure. The apparatus is applied to a UE and includes a processing unit 401.

The processing unit 401 is configured to measure M first frequencies on condition that the UE has a power-saving requirement. Electricity consumed by measuring the M first frequencies is less than that consumed by measuring N first frequencies. The N first frequencies are measured on condition that the UE has no power-saving requirement. N is a positive integer and larger than or equals M. A first priority of the first frequency is higher than a second priority of a second frequency, where a current serving cell which the UE is camped on is on the second frequency.

In an implementation of the disclosure, before the processing unit 401 measures the M first frequencies, the processing unit 401 is further configured to obtain the M first frequencies by selecting from the N first frequencies.

In an implementation of the disclosure, before the processing unit 401 obtains the M first frequencies by selecting from the N first frequencies, the processing unit 401 is further configured to determine M according to N and a first ratio.

In an implementation of the disclosure, the first ratio is determined according to a first system message or first RRC signaling.

In an implementation of the disclosure, the processing unit 401 configured to determine M according to N and the first ratio is configured to determine M by rounding up a product of N and the first ratio.

In an implementation of the disclosure, the processing unit 401 configured to determine M according to N and the first ratio is configured to determine M by rounding down the product of N and the first ratio.

In an implementation of the disclosure, before the processing unit 401 obtains the M first frequencies by selecting from the N first frequencies, the processing unit 401 is further configured to determine the smaller of N and K as M, where K is preconfigured and is the number of the first frequencies to be measured on condition that the UE has the power-saving requirement.

In an implementation of the disclosure, the processing unit 401 configured to obtain the M first frequencies by selecting from the N first frequencies is configured to obtain the M first frequencies by randomly selecting from the N first frequencies.

In an implementation of the disclosure, the processing unit 401 configured to obtain the M first frequencies by selecting from the N first frequencies is configured to obtain the M first frequencies by selecting from the N first frequencies in descending order of priorities of the N first frequencies.

In an implementation of the disclosure, before the processing unit 401 measures the M first frequencies, the processing unit 401 is further configured to set a priority of each of the M first frequencies as a third priority, where the third priority is lower than the first priority.

In an implementation of the disclosure, the apparatus for frequency measurement further includes a communication unit 402. Before the processing unit 401 sets the priority of each of the M first frequencies as the third priority, the processing unit 401 is further configured to send first information to a network device through the communication unit 402, and receive second information from the network device through the communication unit 402, where the first information is indicative of that the UE has the power-saving requirement, and the second information is indicative of that a priority of at least one of the first frequencies is allowed to be set as the third priority.

In an implementation of the disclosure, N equals M on condition that the second information is indicative of that a priority of each of the first frequencies is allowed to be set as the third priority.

In an implementation of the disclosure, the second information is further indicative of the first frequencies allowed to be set in terms of priorities on condition that the second information indicates that priorities of part of the first frequencies are allowed to be set as the third priority. Before the processing unit 401 sets the priority of each of the M first frequencies as the third priority, the processing unit 401 is further configured to determine the M first frequencies according to the second information.

In an implementation of the disclosure, the second information is further indicative of a maximum number of first frequencies allowed to be set in terms of priorities on condition that the second information is indicative of that priorities of part of the first frequencies are allowed to be set as the third priority. Before the processing unit 401 sets the priority of each of the M first frequencies as the third priority, the processing unit 401 is further configured to obtain the M first frequencies by selecting from the N first frequencies randomly or in descending order of the priorities of the N first frequencies on condition that N is larger than the maximum number, where M is the maximum number.

In an implementation of the disclosure, the processing unit 401 is further configured to set the N first frequencies as the M first frequencies on condition that N is smaller than the maximum number.

In an implementation of the disclosure, after setting the priority of each of the M first frequencies, a measurement is conducted on the M first frequencies, where the measurement on the M first frequencies is the same as that on a third frequency, and a priority of the third frequency is the third priority.

In an implementation of the disclosure, the processing unit 401 configured to measure the M first frequencies is configured to determine H first frequencies previously undetected by the UE, and measure the first frequencies among the M first frequencies except for the H first frequencies, where the M first frequencies include the H first frequencies, and H is a positive integer.

In an implementation of the disclosure, a first measurement period of measuring the first frequencies is different from a second measurement period of measuring the second frequencies, and a priority of the second frequency is lower than the priority of the first frequency.

In an implementation of the disclosure, the first measurement period and the second measurement period are determined according to a second system message, the first measurement period and the second measurement period are determined according to second RRC signaling, or the first measurement period and the second measurement period are defined by a protocol.

In an implementation of the disclosure, a third measurement period of measuring the M first frequencies is different from a fourth measurement period of measuring the N first frequencies.

In an implementation of the disclosure, the third measurement period and the fourth measurement period are determined according to a third system message, the third measurement period and the fourth measurement period are determined according to third RRC signaling, or the third measurement period and the fourth measurement period are defined by a protocol.

In an implementation of the disclosure, the processing unit 401 is further configured to determine that the UE has the power-saving requirement on condition that remaining electricity of the UE is less than or equals a first threshold.

In an implementation of the disclosure, the processing unit 401 is further configured to determine that the UE has the power-saving requirement in response to reception of third information from the network device, where the third information is used to instruct the UE to enter a power-saving mode.

In an implementation of the disclosure, first frequencies among the N first frequencies except for the M first frequencies are not measured on condition that the UE has the power-saving requirement and N is larger than M.

It can be noted that the apparatus for frequency measurement further includes a storage unit 403. The processing unit 401 may be realized by a processor. The communication unit 402 may be realized by a communication interface. The storage unit 403 may be realized by a memory.

A computer-readable storage medium is also provided in implementations of the disclosure. The storage medium is configured to store a computer program for electronic data interchange, where the computer program is operable with a computer to perform all or part of the operations in any of the method implementations. The computer includes the UE.

A computer program product is also provided in implementations of the disclosure. The computer program product includes a non-transitory computer-readable storage medium that stores computer programs. The computer programs are operable with a computer to perform all or part of the operations in any of the method implementations. The computer program product may be a software installation package. The computer includes the UE.

It is to be noted that, for the sake of simplicity, the foregoing method implementations are described as a series of action combinations, however, it will be appreciated by those skilled in the art that the disclosure is not limited by the sequence of actions described. According to the disclosure, certain operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed herein may be implemented in other manners. For example, the apparatus implementations described above are merely illustrative. For instance, the unit division is only a logical function division and there can be other manners of division during actual implementations, for example, multiple units or components may be combined or may be integrated into another system, or some features may be ignored, omitted, or not performed. In addition, coupling or direct coupling or communication connection among illustrated or discussed components may be indirect coupling or communication connection among devices or units via some interfaces, and may be electrical connection or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the disclosure. The memory includes various medium capable of storing program codes, such as a universal serial bus (USB) flash disk, a read-only memory (ROM), a random-access memory (RAM), a removable hard disk, a disk, a compact disc (CD), or the like.

It will be understood by those of ordinary skill in the art that all or a part of operations in the various methods in the implementations described above may be accomplished by means of a program to instruct associated hardware. The program may be stored in a computer-readable memory which may include a flash memory, a ROM, a RAM, a disk, a CD, or the like.

The implementations of the disclosure are described in detail as above. Specific implementations are employed to elaborate the principles of the disclosure. The description of the implementations is merely used to facilitate the understanding of the method and essential spirit in the disclosure. It can be noted that according to the idea of the disclosure, a person of ordinary skill in the art can make modifications or changes on the implementations and application scopes. Based on the above, the specification shall not be understood as a limitation on the disclosure.

What is claimed is:

1. A method for frequency measurement, comprising:
   measuring M first frequencies on condition that a user equipment has a power-saving requirement, wherein electricity consumed by measuring the M first frequencies is less than that consumed by measuring N first frequencies, wherein
   the N first frequencies are measured on condition that the user equipment has no power-saving requirement, N is a positive integer and larger than or equals M, and a first priority of the first frequency is higher than a second priority of a second frequency, wherein a current serving cell which the user equipment is camped on is on the second frequency.

2. The method of claim 1, further comprising:
   prior to measuring the M first frequencies,
   obtaining the M first frequencies by selecting from the N first frequencies.

3. The method of claim 2, further comprising:
   prior to obtaining the M first frequencies by selecting from the N first frequencies,
   determining M according to N and a first ratio.

4. The method of claim 3, wherein
   the first ratio is determined according to a first system message or first radio resource control (RRC) signaling.

5. The method of claim 3, wherein determining M according to N and the first ratio comprises:
   determining M by rounding up a product of N and the first ratio.

6. The method of claim 3, wherein determining M according to N and the first ratio comprises:
   determining M by rounding down a product of N and the first ratio.

7. The method of claim 2, wherein obtaining the M first frequencies by selecting from the N first frequencies comprises:
   obtaining the M first frequencies by randomly selecting from the N first frequencies.

8. The method of claim 1, further comprising:
   prior to measuring the M first frequencies,
   setting a priority of each of the M first frequencies as a third priority, wherein the third priority is lower than the first priority.

9. The method of claim 8, wherein
   prior to setting the priority of each of the M first frequencies as the third priority,
   sending first information to a network device, wherein the first information is indicative of that the user equipment has the power-saving requirement; and
   receiving second information from the network device, wherein
   the second information is indicative of that a priority of at least one of the first frequencies is allowed to be set as the third priority, and the second information is further indicative of a maximum number of first frequencies allowed to be set in terms of priorities on condition that the second information indicates that priorities of part of the first frequencies are allowed to be set as the third priority;
   the method further comprises:
   prior to setting the priority of each of the M first frequencies as the third priority,
   obtaining the M first frequencies by selecting from the N first frequencies randomly or in descending order of the priorities of the N first frequencies on condition that N is larger than the maximum number, wherein M is the maximum number.

10. The method of claim 8, comprising:
    after setting the priority of each of the M first frequencies, conducting a measurement on the M first frequencies, wherein the measurement on the M first frequencies is the same as that on a third frequency, wherein a priority of the third frequency is the third priority.

11. The method of claim 1, wherein a first measurement period of measuring the first frequencies is different from a second measurement period of measuring the second frequencies.

12. The method of claim 1, wherein first frequencies among the N first frequencies except for the M first frequencies are not measured on condition that the user equipment has the power-saving requirement and N is larger than M.

13. A user equipment comprising:
a processor; and
a memory storing a program which, when executed by the processor, causes the processor to:
measure M first frequencies on condition that the user equipment has a power-saving requirement, wherein electricity consumed by measuring the M first frequencies is less than that consumed by measuring N first frequencies, wherein
the N first frequencies are measured on condition that the user equipment has no power-saving requirement, N is a positive integer and larger than or equals M, and a first priority of the first frequency is higher than a second priority of a second frequency, wherein a current serving cell which the user equipment is camped on is on the second frequency.

14. The user equipment of claim 13, wherein the program, when executed by the processor, further causes the processor to obtain the M first frequencies by selecting from the N first frequencies.

15. The user equipment of claim 14, wherein the program, when executed by the processor, further causes the processor to determine M according to N and a first ratio.

16. The user equipment of claim 15, wherein the first ratio is determined according to a first system message or first radio resource control (RRC) signaling.

17. The user equipment of claim 15, wherein the processor configured to determine M according to N and the first ratio is configured to determine M by rounding up a product of N and the first ratio.

18. The user equipment of claim 15, wherein the processor configured to determine M according to N and the first ratio is configured to determine M by rounding down a product of N and the first ratio.

19. The user equipment of claim 14, wherein the processor configured to obtain the M first frequencies by selecting from the N first frequencies is configured to obtain the M first frequencies by randomly selecting from the N first frequencies.

20. A non-transitory computer-readable storage medium storing a computer program which, when executed by a processor, causes the processor to carry out an action comprising:
measuring M first frequencies on condition that a user equipment has a power-saving requirement, wherein electricity consumed by measuring the M first frequencies is less than that consumed by measuring N first frequencies, wherein
the N first frequencies are measured on condition that the user equipment has no power-saving requirement, N is a positive integer and larger than or equals M, and a first priority of the first frequency is higher than a second priority of a second frequency, wherein a current serving cell which the user equipment is camped on is on the second frequency.

* * * * *